Patented Apr. 14, 1953

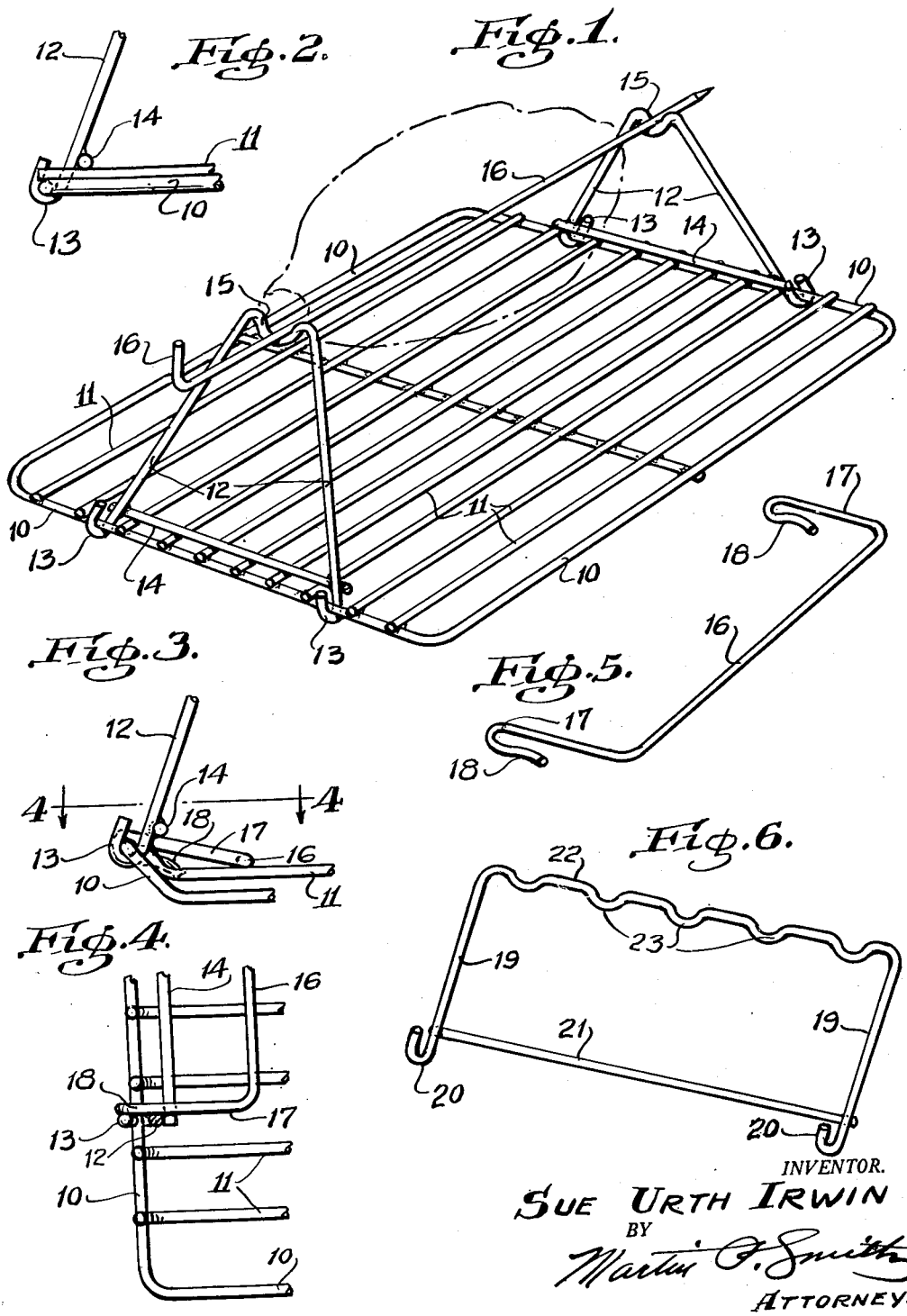

2,634,674

UNITED STATES PATENT OFFICE 2,634,674

ROASTING RACK

Sue Urth Irwin, Los Angeles, Calif.

Application August 2, 1951, Serial No. 239,915

3 Claims. (Cl. 99—419)

My invention relates to racks for roasting turkeys, chicken and large pieces of meat such as hams, roasts of beef and the like and my invention consists in combining with the wire rack usually found in practically all gas stoves, frames which occupy inclined positions on the ends of said wire rack and receive a spit, upon which the piece of meat or fowl that is being roasted, is impaled.

For those racks which have upturned end portions, I propose to locate on the ends of such racks, applicators which provide simple and efficient means for holding the end frames in proper inclined positions upon said racks.

A further object of my invention is to provide simple and efficient means adapted to be applied to the ends of the racks used in cooking the food product known as "shish-kabob," wherein small pieces of meat are impaled on spits and placed over the fire of a barbecue.

A further object of the invention is to provide a roasting rack of the class described, that is simple in structure, inexpensive of manufacture and very effective in performing the functions for which it is intended.

With the foregoing and other objects in view, my invention consists in certain novel features of construction and arrangement of parts, which will be hereinafter more fully described and claimed, and illustrated in the accompanying drawing, in which:

Fig. 1 is a perspective view of a roasting rack of my improved construction,

Fig. 2 is a detailed side elevation of the end of the rack,

Fig. 3 is a side elevation of a rack with upturned ends and provided with the adaptor for reception of the upright end frames, Fig. 4 is a plan view of the parts seen in Fig. 3, Fig. 5 is a perspective view of the adaptor, Fig. 6 is a perspective view of one of the end pieces of the rack used in roasting "shish-kabob."

Referring by numerals to the accompanying drawing which illustrates a preferred embodiment of my invention, 10 designates the marginal member of the rack, same being generally rectangular in form, constructed from fairly heavy wire and provided with longitudinally disposed parallel wire rods 11, the ends of which are spot welded on the tops of end pieces of frame 10.

The end frames 12 of my improved rack are substantially inverted V-shape, formed of wire with upturned lower ends 13 adapted to be hooked beneath the end rails of frame 10, and in order to hold said end frames in proper inclined positions above the ends of said rack, a transverse wire 14 has its ends spot welded to the upright legs of each frame 12, which rail rests on the intermediate wire rods 11.

The upper ends of frames 12 are bent downward to form U-shaped bearings 15 for the spit which passes through the fowl or piece of meat being roasted. One end of the spit is turned at right angles to the main body of said spit, thus providing a convenient means for rotating the meat while roasting. This form of my invention is simple, easily assembled or taken apart and provides effective means for roasting fowl and all large pieces of meat.

In Figs. 3, 4 and 5, I have shown a construction particularly designed for use in connection with racks which have upturned ends and this structure adaptors as shown in Fig. 5 are used. These adaptors comprise wires 16 having their ends bent at right angles as designated by 17 and formed into hooks 18 which are designed to engage over the end rails of the main frame 10.

After the adaptors are in position on the main frame, the hooks 13 of the frames 12 are engaged beneath the end rails of frame 10 with transverse rail 14 bearing on top of the bent ends 17 of the adaptor.

In Fig. 6, I have shown a frame comprising parallel side members 19, the lower ends of which are formed into upturned hooks 20, adapted to engage the ends of a barbecue rack and with a transverse wire rod 21 which performs the same functions as transverse rod 14.

Formed in the top rail 22 of each frame, is a series of downwardly bent portions 23 which function as bearings for a number of spits upon which are impaled small portions of meat, which, when roasted, are served as "shish-kabob."

Thus, it will be seen that I have provided means which is capable of being readily combined with an ordinary stove or barbecue rack, thus making it possible to very conveniently roast fowl and the large pieces of meat as well as smaller portions of meat known as "shish-kabob."

Various changes in the size, form and construction of my improved roasting rack may be made and substituted for those herein shown and described without departing from the spirit of my invention, the scope of which is set forth in the appended claims.

I claim as my invention:

1. The combination with a stove rack having transversely disposed end rails, of means for supporting a piece to be roasted above said rack, comprising end frames of wire, having outwardly and upwardly turned lower ends, for engaging beneath the end rails of said stove rack, transverse rails on the lower portions of said end frames for resting on the stove rack inwardly from the ends thereof, so as to support the frames in inwardly inclined positions above the ends of said stove rack, and a spit removably positioned on the upper ends of said frames.

2. The combination with a stove rack having transversely disposed end rails, of means for supporting a piece to be roasted above said rack, comprising end frames of wire having outwardly and upwardly turned lower ends for engaging beneath the end rails of said stove rack, transverse rails on the lower portions of said end frames for resting on the stove rack inwardly from the ends thereof, so as to support the frames in inwardly inclined positions, above the ends of said stove rack, and spit bearings formed in the upper portions of said end frames.

3. The combination as set forth in claim 2 and with a spit removably positioned in said bearings.

SUE URTH IRWIN.

References Cited in the file of this patent

UNITED STATES PATENTS

| Number | Name | Date |
|---|---|---|
| 311,662 | Knight | Feb. 3, 1885 |
| 876,579 | Nelson | Jan. 14, 1908 |
| 1,061,431 | West | May 13, 1913 |
| 2,521,220 | Huntington | Sept. 5, 1950 |